United States Patent [19]
Charron

[11] Patent Number: 4,740,725
[45] Date of Patent: Apr. 26, 1988

[54] HYDRAULIC MICROTURBOALTERNATOR

[75] Inventor: Jean-Claude Charron, Saint Maur, France

[73] Assignee: Chaffoteaux et Maury, France

[21] Appl. No.: 26,633

[22] PCT Filed: Jun. 4, 1986

[86] PCT No.: PCT/FR86/00190
§ 371 Date: Feb. 6, 1987
§ 102(e) Date: Feb. 6, 1987

[87] PCT Pub. No.: WO86/07503
PCT Pub. Date: Dec. 18, 1986

[30] Foreign Application Priority Data
Jun. 6, 1985 [FR] France .............. 85 08544

[51] Int. Cl.⁴ .................. H02K 7/18; F23Q 9/14
[52] U.S. Cl. .................. 310/88; 126/344; 431/255; 310/75 R
[58] Field of Search ............... 122/13 R; 126/344; 277/80, 51; 290/52; 310/85, 87, 88, 89, 90, 75 R; 361/258, 259, 260; 384/144, 446, 480; 417/366, 423 K; 431/255, 256

[56] References Cited
U.S. PATENT DOCUMENTS 3,344,513 10/1967 Bemmann .............. 29/596
4,086,508 4/1978 Matsumoto .............. 310/86
4,416,586 11/1983 Diederich et al. .............. 417/423 K
4,652,215 3/1987 Kuroyanagi et al. .............. 417/219

FOREIGN PATENT DOCUMENTS 3012636 10/1981 Fed. Rep. of Germany .
7908193 1/1983 Fed. Rep. of Germany .
1215731 4/1960 France .
1490440 7/1967 France .
2435144 3/1980 France .
2024528 1/1980 United Kingdom .

Primary Examiner—Patrick R. Salce
Assistant Examiner—D. L. Rebsch
Attorney, Agent, or Firm—Larson and Taylor

[57] ABSTRACT

The hydraulic microturboalternator comprises a plastic molding which wraps the laminated stator (2) of the microalternator while providing an interior water chamber (20) intended to receive the rotor (1) and of which the inner diameter is at least equal to the outer diameter of the rotor increased by a fraction of the radial thickness of an airgap of particular shape and size, said molded body being sealingly closed by a casing (14) which limits a water chamber (21) containing the turbine (15) and which communicates with the chamber (20). Application is to gas-operated apparatuses for the production of hot water but designed to function without a permanent ignition pilot.

8 Claims, 2 Drawing Sheets

HYDRAULIC MICROTURBOALTERNATOR

The present invention relates to a hydraulic microturboalternator for forming more specially a small independent source of electric power providing the functions of automatic lighting, control and regulation of the intake of gas to the burner of a domestic gas-using appliance of the instantaneous gas water-heater kind, not equipped with a permanent pilot light.

The advantage is well known, from the power saving point of view, of developing instantaneous hot-water production appliances using gas, capable of operating without a permanent pilot light; it is sufficient to recall that the power of the pilot light which normally equips any conventional gas water-heater is of the order of 160 W which represents an annual power consumption of about 1,300 KWH.

Besides the power saving, doing away with the traditional permanent pilot light, presents other very interesting aspects; in particular it reassures and comforts an appreciable fraction of potentional customers who would be favorable to the use of gas appliances if they did not involve the permanent presence of a flame in their dwelling and if they could be as simple to use as an electric appliance.

Up to present, these new appliances have an essential requirement in common, which is that of requiring an external source of electric power, while doing away with the permanent pilot light, for accomplishing the normal functions of lighting the gas, of controlling such lighting and finally of controlling and regulating the gas intake to the burner. Three ways of obtaining this source of power external to the appliance are at present known:

The first one is obviously to draw this power from the electric mains of the dwelling in which the appliance is installed. This is the most widely used solution, particularly when it is a question of using gas boilers without permanent pilot lights in which connection to the mains is in any case necessary for feeding the circulation pump; but in the case of appliances of the instantaneous gas water-heater kind, this solution is considered as causing an excessive additional cost of the appliance and it has also the following drawbacks:

On the one hand, it limits the possibilities of geographic implantation of the appliance while seriously increasing the cost of its installation, particularly with respect to safety surrounding the bath in a bathroom because of the need to use a low voltage transformer complying with special fairly strict safety standards.

On the other hand it offsets the advantage of functional independence of a water-heater which normally continues to operate despite possible reductions in the electric power supply.

The second known solution consists in creating a power source by means of a conventional electric battery such as is done for powering traditional portable radios. This second solution of course avoids the drawbacks formed by the excessive costs and installation restrictions, but it is accompanied by other drawbacks which are the following:

The duration of storage and use of a battery cannot be guaranteed and its operating time under normal service conditions depends on the kind or type of battery provided. This constitutes a limitation for those in the distribution network, particularly for wholesalers or foreign importers.

Also, the user will sooner or later, but without the possibility of foreseeing it, experience the moment when his appliance suddenly stops functioning because the battery is exhausted.

The third solution consists in creating this source of electric power in a totally independent way from the available hydraulic energy which represents the necessary flow of a certain amount of water through the appliance whenever the user draws it. This solution is the incorporation of a microturbogenerator in the water circuit of the appliance as described in FR-A-1 215 731.

This solution, whose principal was set forth in the above-mentioned patent has never found industrial applications, because up to the present, it has not been possible to design or perfect a microturboalternator which delivers sufficient electric power with acceptable efficiency and reliability, as well as a fairly low cost, so as to make this third solution competitive. One of the main difficulties to overcome in this kind of microgenerator was the resistant torque to be overcome for setting the rotary magnet forming the rotor in rotation, to force its poles past the corresponding magnetic poles of the wound stator of the microalternator.

Another problem to solve was that of avoiding the risk of mechanical clogging of the rotor by the magnetic particles which the water passing through the turbine may convey and which included the risk of the particles being attracted by the magnet of the rotor and being jammed in the airgap.

The object of the present invention is to provide a microturboalternator which finally satisfies exactly the conditions of electric power, efficiency and reduced cost, such that this third solution becomes extremely competitive with respect to the first two.

According to a main feature of the invention, the body of the microturboalternator is formed entirely from a single encapsulation of plastic material which completely encloses the laminated stator of the microalternator, while leaving an inner water chamber of cylindrical shape intended to receive the rotor of the alternator and whose inner diameter is at least equal to the outer diameter of said rotor increased by a fraction of the radial thickness of an airgap, of special shape and dimensions, provided between the rotor and the stator, the molded body being sealingly closed by a case which defines a water chamber connected to the water flow pipe which contains the turbine, and which communicates with the chamber.

According to another feature of the invention, the rotor, located in a water chamber, is fitted on a freely rotating shaft of rotation while bearing on one side on the body of the microturboalternator and on the other on the bottom of the case, the turbine located in the water chamber of this case being also fitted onto the rotational shaft, and between the two water chambers a magnetic screen is provided having the shape of a disc clamped sealingly between the encapsulated body of the microturboalternator and the case containing the turbine.

According to a particular feature of the invention the magnetic screen forming disc includes about its central orifice a small cylindrical collar directed towards the back of the turbine wheel, which is intended to be positioned without touching it in a small cylindrical housing formed in the hub of said turbine and oriented towards the disc.

According to another feature of the invention, the inner pole surface of the stator through which passes the magnetic flux supplied by the bipolar magnet forming the rotor, has a generally cylindrical shape except along two of its generatrices situated in its plane of symmetry, where said inner pole surface has a cut-out in the form of a V forming two very small airgaps widening outwardly from the inner pole surface of the stator, each airgap having at the level of the inner pole surface of the stator a thickness such that the angle at the center intercepted by an arc of this thickness is less than 15°, and in that from this thickness the profile of the V cut-out of the airgap has an angle of divergence greater than 30°.

Other particular features and advantages of the invention will be clear from the following description of one embodiment with reference to the accompanying drawings which show:

FIG. 1 a sectional view of the microturboalternator through line I—I of FIG. 2,

Figure 1:
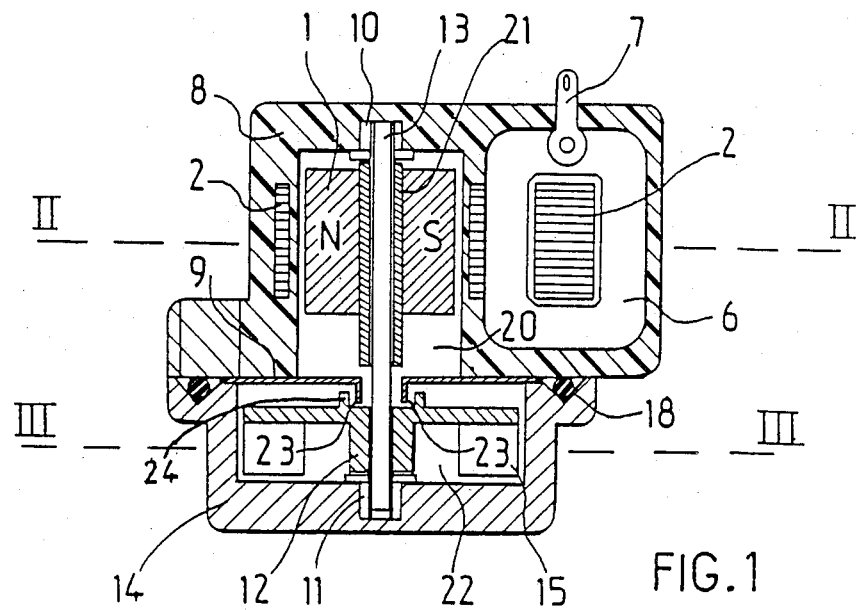
Figure 2:
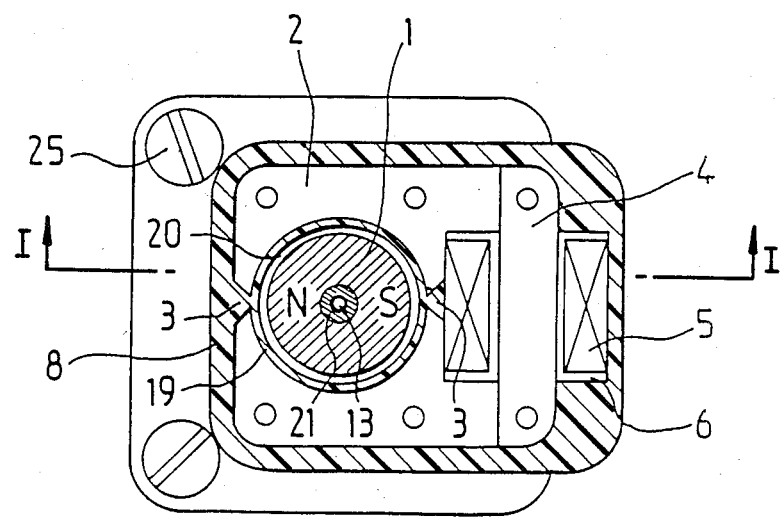
FIG. 2 is a sectional view through line II—II of FIG. 1.

Referring more precisely to FIGS. 1 and 2 it can be seen that the hydroturboalternator is formed essentially of a plastic material body 8, molded about the magnetic circuit of a stator formed of stacked plates 2 and a core 4 closing the magnetic field lines which receives a stator winding 5 wound on an insulating body 6 having electric connecting tags 7.

A bipolar north-south magnet 1 which forms the rotor is fitted on to a rotational shaft 13 by means of a centering socket 21. It rotates freely between the pole pieces 2 of the stator inside a cylindrical chamber 20 formed during molding of the plastic body 8 about the magnetic stator. This molding is carried out in a mold whose central core for forming chamber 20 is a smooth cylinder having a diameter equal to the diameter of the rotor 1 increased by a certain thickness as will be seen further on. The molding introduces a cylindrical airgap 19 between rotor and stator whose inner surface defines the chamber 20 inside which the rotor rotates.

Figure 3:
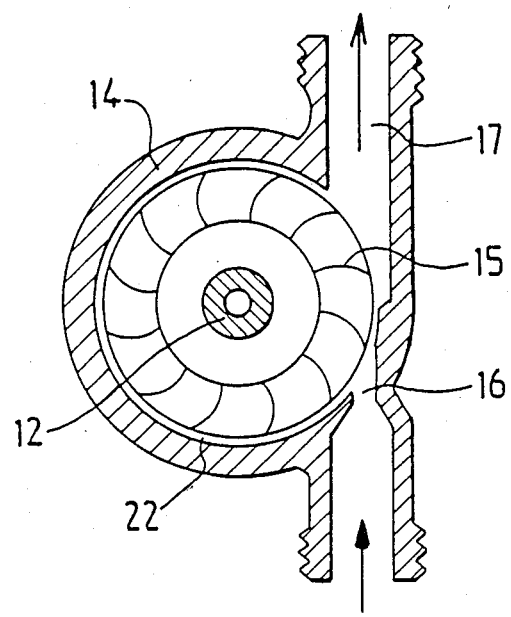
FIG. 3 is a sectional view through line III—III of FIG. 1.

The molded body 8 is sealingly closed by a case 14 which defines a water chamber 22 in which rotates a turbine 15 mounted on a hub 12. As illustrated in FIG. 3, case 14, forming the body of the turbine 15, has passing tangentially therethrough a pipe 17 whose inlet is provided with a convergent nozzle 16. The water admitted in the direction of the arrow strikes the cylinder portion shaped blades of the turbine wheel 15 tangentially and leaves through pipe 17.

Shaft 13, which carries rotor 1, as well as the turbine 15 through its hub 12, bears on one side on body 8 through bush 10 and, on the other side, on the bottom of case 14 through bush 11.

The water chambers 20 and 22 in which rotate respectively the rotor 1 and turbine 15 are separated by a magnetic screen forming a dividing wall and having the shape of a disc 9 having in its center an orifice greater than the diameter of shaft 13. This latter may therefore rotate freely. Furthermore, the small clearance which exists between the shaft and this orifice allows the water to pass. The disc 9 has about its central orifice a small cylindrical collar 23 directed towards the back of the turbine wheel 15 which penetrates with a slight clearance into a small cylindrical housing 24 and which consequently does not touch it, this housing 24 being formed in the hub 12 of the turbine and oriented towards the disc. The screen disc 9 is clamped between the body 8 and case 14, a resilient seal 18 being further provided between these two parts which are assembled together by means of screws 25. Disc 9, which is placed closer to turbine 15 than magnet 1, is made from a magnetically permeable material and is protected from corrosion. It has a diameter at least equal to the diameter of the wheel of the turbine. This disc forms a screen preventing any magnetic field leak coming from the magnet from penetrating into the water which flows in the turbine portion, and consequently preventing the passage of possible magnetic particles conveyed by the water of the turbine portion from passing into the chamber containing the rotor.

The part of the magnetic circuit of stator 2 in which rotates the smooth cylindrical magnet 1, magnetized (N-S) across a diametrical plane, also has a perfectly cylindrical smooth, or substantially smooth, geometrical shape at the level of its inner surface defining the airgap 19 between rotor and stator, while having the general magnetic structure of a bipolar rotor.

Figure 4:
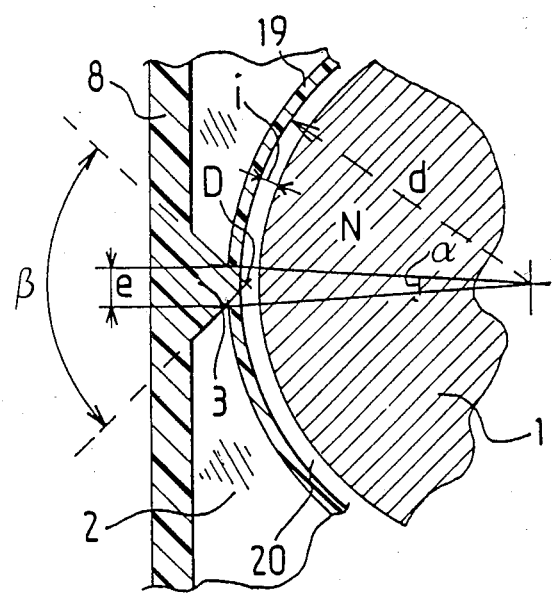
FIG. 4 is a partial view on a larger scale of the part of FIG. 2 showing the particular shape of the cut-out in the plates of the stator.

This inner pole surface of stator 2 through which passes the magnetic flux supplied by the bipolar magnet forming the rotor, has a generally cylindrical shape except along two of its generatrices situated in its plane of symmetry, where said inner pole surface has a V shaped cut-out forming two very small airgaps 3 widening outwardly from the cylindrical airgap 19. The shape of these airgaps 3 can be seen more clearly in FIG. 4. The thickness of each airgap 3, cut out at the level of the inner cylindrical surface of the stator, defining the airgap 19 between stator and rotor, corresponds to an angle at the center $\alpha$ whose value is less than 15°. Furthermore, the profile of the V shaped cut-out from a starting point D on the inner cylindrical surface of the stator has an angle of divergence $\beta$ greater than 30°. The magnetic reluctance of each of these airgaps, while still being very large compared with the total reluctance of the pole pieces of the stator and their magnetic closure core 4 receiving the stator winding, remains relatively very small compared with the average reluctance offered by the cylindrical airgap between the magnet of the rotor and the inner surface of the stator, this reluctance thus varying only very little during passage of the flux lines of the magnet from one pole to another during rotation thereof between the pole pieces of the stator.

It can also be seen in this same figure that the diameter of chamber 20 formed during molding of body 8, and in which the rotor 1 rotates, is equal to the diameter of this rotor increased by a space or gap i. This space i represents about half the thickness of the airgap 19 between stator and rotor.

What is claimed is:

1. A hydraulic microturboalternator comprising:
a small blade turbine wheel mechanically coupled to a microalternator having a rotor in the form of a small cylindrical magnet with non projecting poles, said rotor being located in a liquid, the turbine wheel having a shaft and said rotor being fixedly mounted to said shaft, a laminated stator formed of stacked plates and including a stator winding, a body of the microturboalternator being entirely formed of a single plastic material molding which completely encloses the laminated stator of the microalternator while leaving an inner water chamber of cylindrical shape for receiving the said rotor, the inner diameter of said inner water chamber being at least equal to the outer diameter of said rotor, increased by a fraction of the radial thickness of an airgap of predetermined shape and dimensions located between the rotor and the stator, said molded body being sealingly closed by a case which defines a second water chamber which is connected to a water flow pipe, said second water chamber containing the said turbine and communicating directly with the inner water chamber, from which it is separated by a magnetic screen having the shape of a disk, which disk has a circular center orifice for the free passage of the said shaft with a slight clearance.

2. A hydraulic microturboalternator according to claim 1, wherein the shaft is received in bushings, one in the molded body and the other in the casing.

3. Hydraulic microturboalternator according to claim 1, characterized in that the disc (9) is sealingly clamped between the molded body (8) of the microalternator and the case (14) containing the turbine (15).

4. Hydraulic microturboalternator according to claim 1, characterized in that the magnetic screen forming disc (9) has about its central orifice a small cylindrical collar (23) directed towards the back of the turbine wheel (15) without touching said turbine wheel, in a small cylindrical housing formed in the hub (12) of said turbine and oriented towards the disc.

5. Hydraulic microturboalternator according to claim 1, in which the inner pole surface of the stator (2) through which passes the magnetic flux supplied by the bipolar magnet forming the rotor (1) has a generally cylindrical shape, characterized in that along two of its generatrices situated in its plane of symmetry, said inner pole surface has a symmetrical V cut-out forming two very small airgaps (3) widening outwardly from the inner pole surface of the stator.

6. Hydraulic microturboalternator according to claim 5, characterized in that each airgap (3) has at the level of the inner pole surface of the stator (2) a thickness e such that the angle at the center $\alpha$ intercepted by an arc of this thickness e is less than 15° and in that from this thickness the profile of the V cut-out of the airgap has an angle of divergence $\beta$ greater than 30°.

7. Hydraulic microturboalternator according to claim 1, characterized in that the diameter d of the inner chamber (20) formed during molding of the body (8) and in which the rotor (1) rotates is equal to the diameter of this rotor increased by a space i representing about half the thickness of the airgap (19) between stator and rotor.

8. Hydraulic microturboalternator according to claim 1, characterized in that the diameter d of the inner chamber (20) formed during molding of the body (8) and in which the rotor (1) rotates is equal to the diameter of this rotor increased by a space i representing about half the thickness of the airgap (19) between stator and rotor.

* * * * *